United States Patent [19]

Carter

[11] Patent Number: 4,668,138

[45] Date of Patent: May 26, 1987

[54] TOOL HOLDER

[75] Inventor: Jack W. Carter, Carson, Calif.

[73] Assignee: Northrop Corporation, Hawthorne, Calif.

[21] Appl. No.: 750,400

[22] Filed: Jul. 1, 1985

[51] Int. Cl.⁴ .......................... B23B 31/04; B23C 5/26
[52] U.S. Cl. ..................................... 409/234; 279/1 S; 279/1 TS; 279/83; 279/99; 408/146; 408/240
[58] Field of Search ............... 409/231, 232, 233, 234; 279/1 S, 1 TS, 52, 83, 46, 47, 59, 99, 100, 101, 9 A; 408/146

[56] References Cited

U.S. PATENT DOCUMENTS 2,125,005  7/1938  Jearum ............................ 408/146 X
3,136,563  6/1964  Swanson et al. ...................... 279/83
3,719,367  3/1973  Baturka ........................... 279/1 S X
4,133,545  1/1979  Komori .............................. 279/83

FOREIGN PATENT DOCUMENTS 1929696  12/1969  Fed. Rep. of Germany ...... 279/1 S

Primary Examiner—Z. R. Bilinsky
Attorney, Agent, or Firm—Terry J. Anderson; Michael B. Lachuk

[57] ABSTRACT

A tool holder for supporting an end mill tool. The tool holder has a main body portion, a collet and a collar operable together to apply radial forces to hold the tool. The tool holder also has a threaded adjustment device operable with the tool to hold the tool in a predetermined axial position. A set screw is operable with the adjustment device to further insure against undesired axial movement of the tool.

12 Claims, 3 Drawing Figures

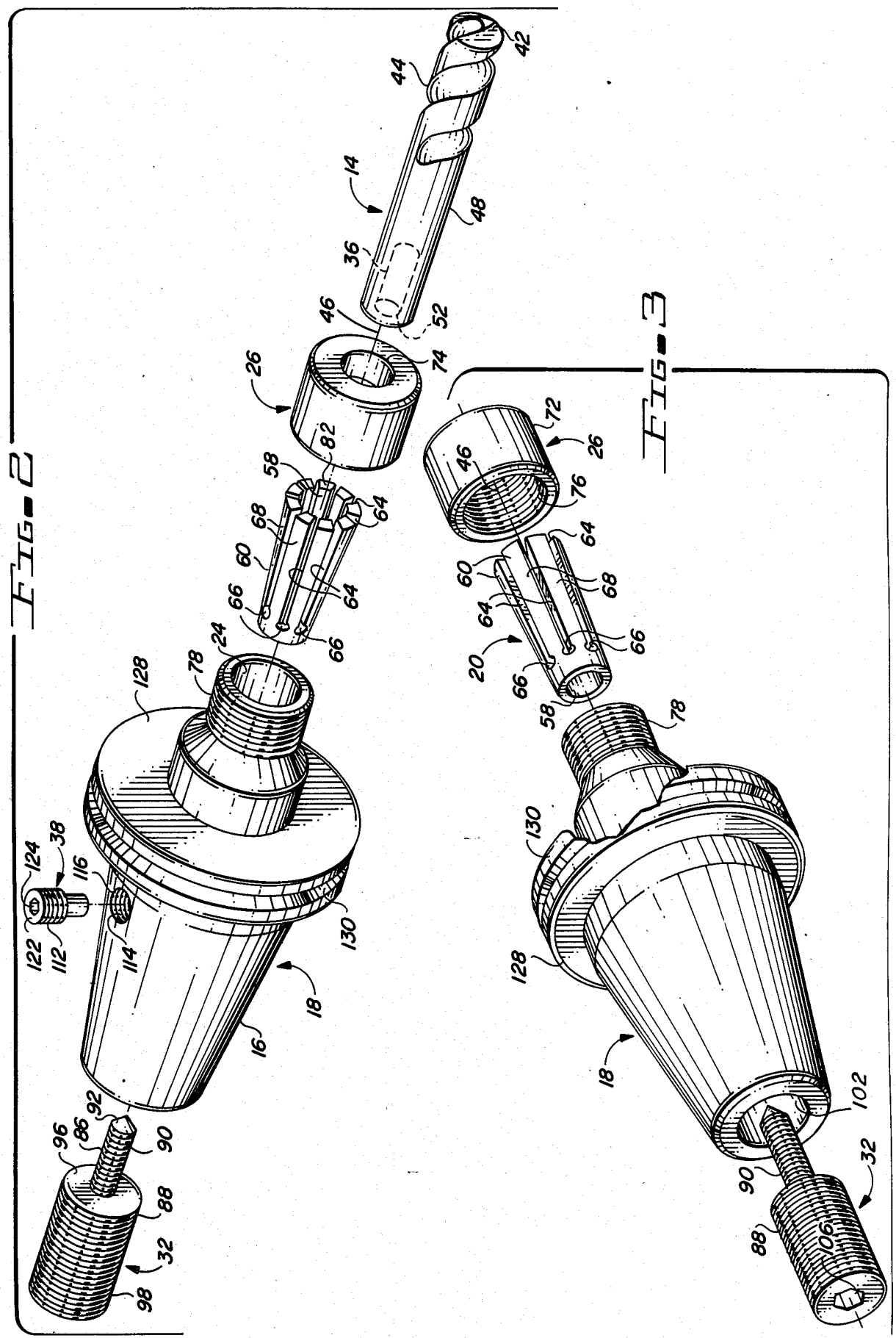

TOOL HOLDER

BACKGROUND OF THE INVENTION

1. Field of the Invention

This invention relates generally to tool holders and more specifically to apparatus for holding tools in a predetermined orientation with respect to the machine in which they are to be utilized as well as with respect to the work piece.

2. Description of the Prior Art

Various types of devices have been designed and utilized for securing a tool in a proper orientation with respect to the machine, with its power imparting mechanisms, in which the tool is to be employed. When such power imparting mechanisms are in an automatic milling, drilling, grinding or other similar machine, it is also desired to maintain the tool in proper orientation with respect to the work piece being acted upon. This is because in many modern machines of this type the movement of the work piece is programmed for predetermined motion relative to the machine, its power imparting mechanisms, the tool holder and the tool.

When, for example, the machine and tool constitute an end mill, as is the case with the preferred form or embodiment of the present invention, the tool is rotatable about its axis and that axis is the same as the axis of rotation of the holder supporting the tool. Only when in such orientation can the machine and tool function properly for accurate cuts of the work piece. Unfortunately, however, it often happens that the tool becomes moved from its preferred axial alignment and does not rotate in its proper and desired path of rotation. When this occurs, the action of the tool on the work piece cannot be effective to achieve the removal of material from the work piece with the necessary degree of precision which might be required. Further, if the tool is not held properly and securely within the holding apparatus, the proper action of the tool edge against the work piece may deflect the tool to an out of concentric orientation leading to the same undesirable result as if the tool were to be initially inserted improperly. Furthermore, the depth of the tool into the tool holder must also be done with great precision, particularly in those instances where the cutting by the tool is done by the end of the tool as in an end mill and excess axial forces exerted on a tool could disturb the original axial, and even radial, setting.

A wide variety of devices have been developed and utilized in the past in an effort to maintain tools such as end mills in proper orientation. In U.S. Pat. No. 4,229,130 to Franklin, for example, there is disclosed a collet for an externally threaded tool which seats a bit-engaging nut at its inboard end. When the tool is clamped within the collet and the collet is clamped within a tool holder, there are negligible undesirable radial forces on the tool. This improves the ability of the collet to generally retain the tool in its proper orientation. However, the length of the collet acting upon the tool is reduced along with its holding action due to the presence of the nut.

The German Published application Ser. No. 1,929,696 describes the relationship of a large number of specially machined elements including a tool and tool holder which retain the tool from incidental axial removal and also provide for axial adjustments.

U.S. Pat. No. 3,913,935 to Flannery et al. discloses a cutting tool adjustment mechanism wherein the adjustment sleeve is attached to a cutting tool by a lock screw. A set screw locks the entire assembly in position. Radial set screws are also known to lock an axially adjustable screw thread member in a cutting tool holder as described in U.S. Pat. No. 4,152,091 to Kucera. Radial set screws have also been used in holding tools into tool holders at various locations as illustrated by U.S. Pat. Nos. 4,226,562 to Schmid et al; 3,557,419 to Flannery; and 3,159,081 to Erikson. The use of set screws on the tool usually exerts undesirable radial forces on the tool thereby to eliminate the concentricity of the tool during rotation and cutting. Accuracy in cutting is thus impaired. Lastly, tool holding mechanisms of various other types are disclosed in U.S. Pat. Nos. 3,052,999 to Sedgwick et al. and 3,680,435 to Deplante.

As illustrated by the great number of prior art patents, efforts are continuously being made in an attempt to solve the problem of maintaining concentricity of rotating tools. None of these patents discloses or suggests the present inventive combination of elements for securing a tool to a holder to maintain concentricity and axial shifting during operation and use. These patents consistently apply forces to the tool which induce an improper orientation. Alternately, they do not apply forces to maintain such proper orientation. The present invention achieves its purposes, objectives, and advantages over the prior art through new, useful and unobvious tool holding elements which maintain both axial and radial tool orientation throughout operation and use with a minimum number of functioning parts, with a minimum of cost and through the utilization of only readily available materials and conventional components.

These objects and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary of the invention and detailed description describing the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into apparatus for holding a tool comprising a main body portion having at its outboard end external threads and an internal sloping surface. Adjacent its inboard end is a threaded aperture. A collet is also provided as part of the apparatus. The collet has an internal opening of a size slightly greater than that of the tool to be received therethrough and has a sloping exterior surface adapted to be wedged into the sloping internal surface of the main body portion. The collet also has means to allow the collet to deform to a reduced diameter and grasp a tool. The apparatus also includes a collar adapted to receive the tool therethrough. The collar has internal threads adapted to threadingly mate with the external threads of the main body portion whereby movement of the collar towards the main body portion will wedge the collet into the main body portion and reduce its diameter and thereby grasp the tool. A cutter adjustment device is also included and has an outboard threaded section for mating engagement with threads at the inboard end of the tool. The cutter adjustment device also includes an inboard threaded section engagable with the internal threads of the main body portion. Lastly, a locking means is positionable in a radial aperture in the main body portion to contact the cutter adjustment means and thereby secure the tool from axial movement with respect to the main body portion.

The invention also includes the internal sloping surface of the main body portion being formed frustroconical while the collet has a frustro-conical exterior surface and axial slots defining tool gripping fingers therebetween. The tool gripping fingers are the only gripping support for the exterior of a tool being gripped. Further, the cutter adjustment device is formed with an inboard section and an outboard section with the inboard section being thinner than the outboard section. Also, a slot is formed in its inboard end. Further, the inboard end of the cutter adjustment device is of an axial length greater than the axial length of internal threads in the inboard end of the tool. The locking means is a set screw with a hexagonally shaped inset area in its radially outward side while the radially inward face of the locking means contacts the outboard section of the cutter adjustment device. As an additional feature, the main body portion has an enlarged collar with a trapezoidal groove therearound.

The invention may also be incorporated in a tool holder for supporting an end mill tool having flutes at its outboard end and a shank formed of a predetermined exterior diameter at its inboard end and with a threaded internal aperture also at its inboard end. The tool holder comprises a main body portion having an axial bore extending therethrough and has an outboard end with external threads and an internal frustro-conical surface. The main body portion also has a threaded aperture adjacent its inboard end. The tool holder also includes a collet having an axial opening of a size slightly greater than the exterior diameter of the tool to be received and with a frustro-conical exterior surface adapted to be wedged into the frustro-conical surface of the main body portion. The collet also has a plurality of axial slots to allow the collet to deform to a reduced diameter to grasp a tool. The tool holder also includes a collar having an axial bore adapted to receive the tool therethrough and has internal threads adapted to threadingly mate with the external threads of the main body portion whereby rotation of the collar with respect to the main body portion will wedge the collet into the main body portion and thus deform the collet and reduce its diameter and thereby grasp the tool. Also part of the tool holder is a cutter adjustment device having a thinner section at its outboard end for mating engagement with the internal threads at the inboard end of the tool with the cutter adjustment device also having a thicker portion with threads engagable with the internal threads of the main body portion to effectively determine the axial position of the end of the tool with respect to the tool holder. Lastly, locking means positionable in threads of a radial aperture in the main body portion effectively lock the cutter adjustment device, and thereby the tool, from axial movement with respect to the main body portion.

The foregoing has outlined rather broadly the more pertinent and important features of the present invention in order that the detailed description of the invention that follows may be better understood whereby the present contribution to the art can be more fully appreciated. Additional features of the invention will be described hereinafter which form the subject of the claims of the present invention. It should be appreciated by those skilled in the art that the conception and the specific embodiments disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the nature, objects and advantages of the present invention, reference should be had to the following detailed description taken in conjunction with the accompanying drawings in which:

FIG. 2 is an exploded perspective view of the apparatus shown in FIG. 1 when viewed toward the cutting end of the tool, but with the milling machine removed; and FIG. 3 is an exploded perspective view similar to that shown in FIG. 2 but with the tool removed and viewing the apparatus from the opposite direction.

Similar reference numerals refer to similar parts throughout the several drawings.

DETAILED DESCRIPTION OF THE INVENTION

Figure 1:
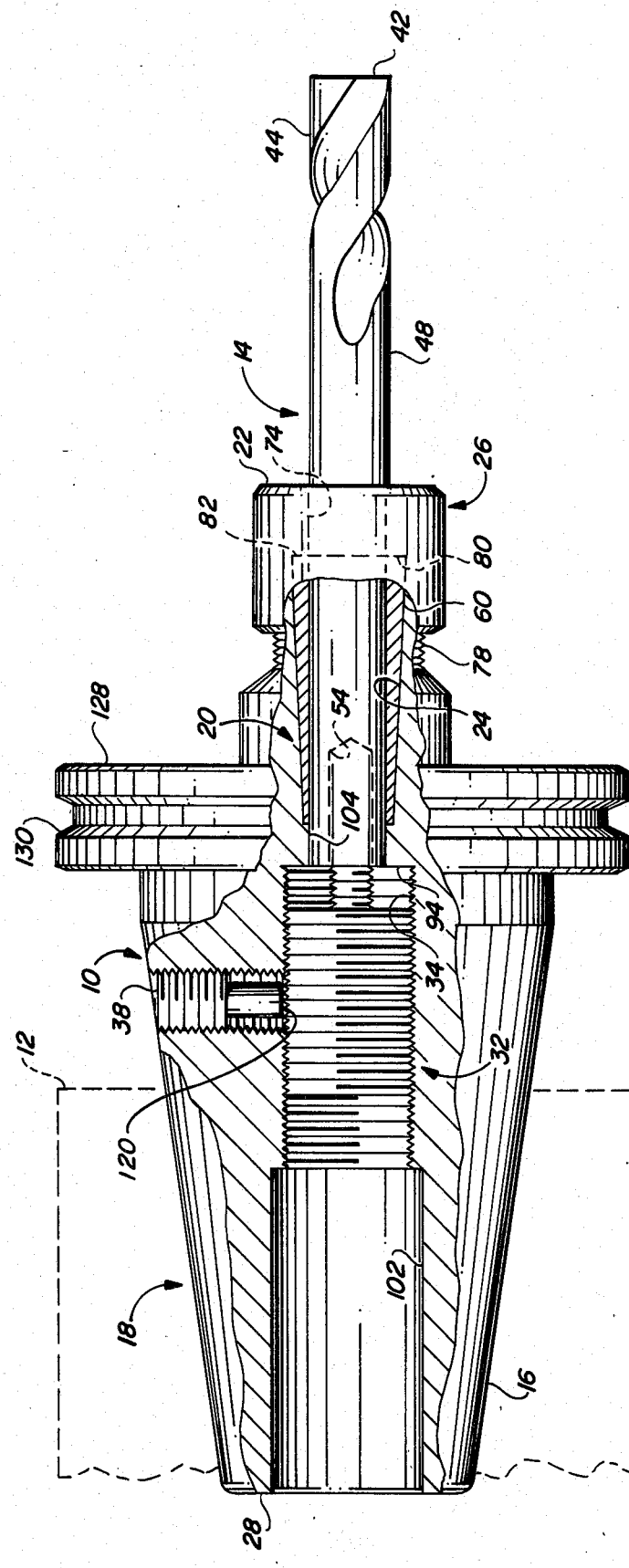
FIG. 1 is an elevational view of the improved tool holder constructed in accordance with the present invention with parts broken away to show certain internal constructions and having mounted therein a tool and also showing, in phantom view, a portion of a milling machine.

Shown in the Figures is the tool holder 10 constructed in accordance with the preferred embodiment of the present invention. In FIGS. 1 and 2 the tool itself is shown. In FIG. 1, the milling machine 12 is also shown and the tool 14 is operationally located within the tool holder. FIG. 3 excludes the tool and shows the operating components in an exploded perspective view from a side opposite from the showing in FIG. 2. In FIGS. 1 and 3, portions of the tool holder have been broken away to illustrate certain internal constructions.

The tool holder itself is constructed of five main portions. The first is the main body portion 18 for supporting the tool 14 at one end and with its shank end 16 for being received in the milling machine 12 which provides the rotational motion to the tool holder and tool. The next main portion is the collet 20 locatable at the lower or outboard end 22 of the tool holder in an aperture 24 of the main body portion. Outboard of both the main body portion and collet is the collar 26 adapted to be threadedly engaged to the outboard end of the main body portion. From the upper or inboard end 28 of the main body portion of the tool holder 10, there is positioned an externally threaded cutter adjustment device 32 mountable in internal threads 34 of the main body portion of the tool holder as well as in internal threads 36 of the inboard end of the tool. Lastly, a locking means 38 in the form of a set screw radially mounts into a central portion of the main body portion of the tool holder to positionally retain the cutter adjustment device in proper axial orientation.

As used in this application, the term "outboard" or "lower" is intended to mean at that end, or toward that end, of the tool 14. This is the lower end as seen in FIG. 1. The term "inboard" or "upper" is intended to mean that end, or toward that end, away from the tool 14. This is the upper end as shown in FIG. 1.

The tool holder of the present invention is adapted to support the tool in a proper orientation with respect to the work piece, not shown, but normally beneath the tool as seen in FIG. 1. The tool holder also is adapted to support the tool in a proper orientation with respect to the machine 12 which provides the rotational power to the tool holder and tool. The tool or bit has an outboard cutting end 42 formed in the conventional manner with spiral grooves 44 or flutes for the removal of cut-away parts of the work piece and for introducing a lubricating fluid to the area being cut. An end mill tool with its essentially flat outboard cutting end 42 is shown and constitutes the preferred form of the invention. Other types of machines and bits could be readily utilized with the resulting precision work piece benefitting from the invention of the present disclosure. The axis of rotation 46 could readily be horizontal as well as vertical, as shown, or adjustable therebetween.

The cutting or outboard end of the tool is integrally formed with the inboard end or shank 48 of the tool. The inboard end is elongated for being clamped by the collet portion of the tool holder for maintaining the proper orientation therebetween. The inboard end of the tool is normally of a smooth surface on its exterior throughout its length.

Note is taken that the majority of the length of the shank of the tool is grasped and secured into position by the collet. The smooth and extended securement of these pieces with respect to each other, without any set screws or the like acting radially upon the tool to its detriment, improves the ability of the tool to retain its concentric orientation during operation and use. This relationship helps the elements to withstand radial forces incurred during operation and use which might tend to destroy such concentricity.

Formed in the inboard end of the tool is an aperture 52 provided with threads 36 concentric with the exterior surface of the tool. The tool and its threads have a common axis 46. The threads are positioned at this location and extend inwardly a predetermined distance to an inner face 54 so as to interact with the cutter adjustment device 32 as will be described later. The entire tool is precision machined from a high carbon steel or the like to resist abrasion and deformation. Such materials are normally required hardware for the high quality of machining from which the present invention is to be utilized. Other hard materials may be employed in whole or in part as on the cutting portions of the tool, as for example titanium, nickel, molybdenum, chromium, carbide, vanadium or the like including alloys and laminates thereof.

As referred to above, the tool is held in position with regard to the tool holder through the collet 20. The collet is a precisely machined element having an essentially conical interior surface 58 with its inside size slightly larger than the outside diameter of the tool which it is adapted to receive. The exterior surface 60 of the collet is sloped or frustro-conical in shape. The collet is adapted to be located within a mating, sloped or frustro-conical aperture 24 at the outboard end of the main body portion of the tool holder with the outboard end of the collet extending slightly beyond the outboard end of the main body portion. Machined into the collet are slots 64 from the outboard end of the collet extending to areas adjacent the inboard end of the collet. These slots preferably terminate in essentially circular openings 66. The purpose of these slots and openings is to allow the inner diameter of the collet to decrease radially and create a grasping action on the inboard end of the tool. This gripping action is effected by the inward wedging of the sections of the collet between the slots, the fingers 68, with respect to the main body portion of the tool holder. The axial movement of the collet with respect to the main body portion, and consequently their radial movement, is effected by the threaded collar being rotationally secured to the outboard end of the main body portion.

The collar 26 has a smooth exterior surface 72, cylindrical in shape with a concentric short bore 74 extending inwardly part way from its outboard end. The diameter of the short bore is slightly greater than the outer diameter of the tool to allow the passage of the tool therethrough. The inboard end of the collar is of a slightly greater diameter and is provided with threads 76 engagable with mating threads 78 on the outboard end of the main body portion. Because of the difference in diameter between the short bore and threaded portion of the collar, a radial shoulder 80 is created within the collar. The radial shoulder is of an extent substantially equal to the outboard surface 82 of the collet. In this manner the threading rotation of the collar will cause the shoulder of the collar to urge the collet inboardly. Because of the wedging action of the exterior surface of the collet against the mating surface of the main body portion, the collet will move inboardly and be wedged radially inwardly against the tool to effect the desired positional securement within the tool holder.

The position of the tool 14 with respect to the tool holder 10 is further secured by the cutter adjustment device 32 and locking means 38. The cutter adjustment device has an outboard thinner section 86 and an inboard thicker section 88. Both sections are essentially cylindrical in shape about a common axis 46 which is also common to the axis of the tool holder and tool. The thinner section has its threads 90 extending outboardly to mate with the internal threads 36 of the tool during operation and use. The thinner section is of an axial length greater than the axial length of the threads in the tool.

In operation and use, the thinner section may be screwed into the tool until its outboard end 92 contacts the bottoms at the internal end 54 of the threaded aperture in the tool. In the alternative, the same effect of bottoming could occur if the thinner end of the cutter adjustment device were axially shorter than the depth of the aperture in the tool. In such a situation, the same effect as bottoming would occur when the inboard shoulder 94 of the tool contacted a shoulder 96 on the cutting adjustment device formed between the thinner and thicker sections. The thicker section of the cutter adjustment device has its threads 98 adapted to be threadingly received in internal threads of the main portion of the tool holder. On the outboard end of the main body portion is a slightly larger unthreaded bore 102 for permitting the positioning of the cutter adjustment device into the main body portion. The only limitation as to the depth that the cutter adjustment device may be moved into the main body portion is the shoulder 96 formed by the inboard end of the threaded portion at the central bore 104 for receiving the tool. The cutter adjustment device 32 is provided at its inboard end with an internal opening 106, having a hexagonal shape and engagable by a hex wrench in the conventional manner for adjusting the axial position of the cutter adjustment device 32. This position will constitute the axial orientation of the tool when a tool is coupled as described above.

Various forces, both axially and radially, are placed upon the tool during operation and use. Axial forces are created by the work piece as the machine, tool holder and tool move into cutting contact with the work piece. Radial forces are created as the cutting tool and the work piece move radially with respect to each other as during the cutting of a slot in the work piece. An additional locking screw 38 or locking means is, therefore, provided in the form of an externally threaded locking means. The threads 112 of the locking screw adjustable couple with the threads 114 of a radial aperture 116 in the main body portion in proximity to the central portion of the thicker portion of the cutter adjustment device. The radially interior surface 120 of the locking means is adapted to contact and secure the cutter adjustment device with respect to the main body portion. The radially exterior end 122 of the locking means is provided with an opening 124, preferably of an internal hexagonal shape for tightening and loosening thereof by a tool in the conventional manner.

With the tool in place threaded onto the thinner portion of the cutter adjustment device and with the collet providing a radial holding force along a substantial length of the shank of the tool through the action of the tightened collar, the tool will be fixedly secured with respect to the tool holder. The exterior surface of the tool holder at its inboard end or shank may thus be received within an appropriate aperture of the motion-imparting mechanisms of the milling machine as is well known in the art. However, because of the orientation of the elements of the tool holder there will be no improper radial forces acting on the tool to disturb the concentricity of the tool during operation and use. Further, axial motion of the tool with respect to the tool holder will also be eliminated by the cutter adjustment device and locking screw. Note is taken that not only will external forces not disturb these orientations, there will be no radial forces or even axial forces acting on the tool which might lessen the ability of the tool to resist reorientation under the action of such cutting forces. Without such an arrangement of elements, runout or nonconcentricity has been known to run as high as 0.003 to 0.010 inches. By utilizing the present inventive arrangement of parts, runout or nonconcentricity has been held to less than 0.0005 inches.

As discussed above, the present invention is shown for illustrative purposes only as being employed in a milling machine of the end mill variety. In most such machines, the machine, tool holder and tool are constructed and arranged for only vertical movement axially toward and away from the work piece. It is the work piece which is usually moved with the work holder portion of the machine, moved with respect to the rotating tool, in a preprogrammed path of travel to effect the cutting configuration desired. Such preprogrammed motion is commonly effected by a numerically controlled computer. Also, it is common for such numerically controlled, NC, milling machines to be preprogrammed to change tools and associated tool holders during an operational cycle. Consequently, the tool holder is provided with an enlarged circumferential collar 128 and trapezoidal groove 130. As is known in the art the machine may thus remove one work holder with its associated tool from the machine and replace it with another of a different size from a prepositioned supply of tools and tool holders as may be required by the particular cutter program being run. The collar and groove function to assist in the selection and replacement of the tool holders as required.

Reference was made above with regard to the high performance and construction and precise tolerances of the tool. Since machines and their parts are also high quality implements, the remaining parts of the tool holder should, likewise, be constructed of high quality materials such as carbon steel machined to precise tolerances. Further, it is preferred that all of the abovedescribed threading of the tool and tool holder be of National Fine sizes rather than National Course sizes for greater tolerance control, adjustability, general tightness and the like.

The present disclosure includes that information contained in the appended claims as well as that in the foregoing description. Although the invention has been described in its preferred form or embodiment with a certain degree of particularity, it is understood that the present disclosure of the preferred form has been made only by way of example and that numerous changes in the details of construction, fabrication and use, including the combination and arrangement of parts and steps, may be resorted to without departing from the spirit and scope of the invention.

What is claimed is:

1. Apparatus for holding a side cutting tool having a threaded bore at its inboard end, comprising:
    a main body portion having at its outboard end external threads and an internal smooth sloping surface, and having adjacent its inboard end a treaded aperture generally coaxial with a longitudinal axis of the body portion;
    a collet having an internal smooth opening of a size slightly greater than the outer diameter of the tool to be received therethrough and having a sloping exterior surface adapted to be wedged into the smooth sloping surface of said main body portion, said collet having means to allow the collet to deform to a reduced diameter and grasp a tool;
    a collar adapted to receive the tool therethrough, said collar having internal threads adapted to threadingly mate with the external threads of said main body portion whereby movement of said collar towards said main body portion will wedge said collet into said main body portion and reduce its diameter and thereby grasp the tool;
    a cutter adjustment device having an outboard threaded section for mating engagement with threads in the inboard bore of the tool and having an inboard threaded section engagable with the internal threads of said main body portion; and
    locking means for preventing movement of the cutter adjustment device with respect to the main body portion, wherein the tool is secured from axial and radial movement with respect to said main body portion.

2. The apparatus as set forth in claim 1 wherein the internal sloping surface of said main body portion is frustro-conical.

3. The apparatus as set forth in claim 1 wherein said collet has a frustro-conical exterior surface and axial slots defining tool gripping fingers therebetween.

4. The apparatus as set forth in claim 3 wherein said tool gripping fingers are the only gripping support for the exterior of a tool being gripped.

5. The apparatus as set forth in claim 2 wherein said cutter adjustment device is formed with an inboard section and an outboard section with the inboard section being thinner than the outboard section.

6. The apparatus as set forth in claim 1 wherein said cutter adjustment device is formed with an opening in its inboard end.

7. The apparatus as set forth in claim 1 wherein the inboard end of said cutter adjustment device is of an axial length greater than the axial length of internal threads in the inboard end of the tool.

8. The apparatus as set forth in claim 1 wherein said locking means is a set screw with a hexagonally shaped inset area in its radially outward face.

9. The apparatus as set forth in claim 1 wherein the radially inward face of said locking means contacts the outboard section of said cutter adjustment device.

10. The apparatus as set forth in claim 1 wherein said main body portion has an enlarged collar with a trapezoidal groove.

11. A tool holder for supporting an end or side mill tool having flutes formed in its outboard end and, at its inboard end, a smooth walled shank formed of a predetermined exterior diameter with a threaded internal aperture, said tool holder comprising:

a main body portion having an axial bore extending there through, said main body potion having an outboard end with external threads and an internal frustro-conical surface, said main body portion also having internal threads within the axial bore adjacent its inboard end;

a collet having an axial opening of a size slightly greater than the exterior diameter of the tool to be received, said collet having a frustro-conical exterior surface adapted to be wedged into the frustro-conical surface of said main body portion, a smooth walled interior surface and a plurality of axial slots to allow said collet to deform to a reduced diameter to grasp a tool;

a collar having an axial bore adapted to receive the tool therethrough, said collar also having internal threads adapted to threadingly mate with the external threads of said main body portion whereby rotation of said collar with respect to said main body portion will wedge the collet into said main body portion and thus deform said collet and reduce its diameter and thereby grasp the tool;

a cutter adjustment device having a thinner threaded section at its outboard end for mating engagement with the internal threads at the inboard end of the tool and a thicker portion with threads engagable with the internal threads of said main body portion to effectively determine the axial position of the end of the tool with respect to the tool holder; and locking means positionalable in threads of a radial aperture in said main body portion to effectively lock said cutter adjustment device from axial movement with respect to said main body position and thereby maintain the axial and radial position of the tool against machining forces.

12. A tool holder for engaging a side or end cutting tool having cutting surfaces along its outboard end and sides, a smooth walled shank of predetermined external diameter at its inboard end and a threaded internal bore at an inboard face of the tool generally aligned along a longitudinal axis of the tool, the tool holder comprising:

a main body portion including an outboard section having an externally threaded outboard end and an internal frustro-conical bore, generally aligned along a longitudinal axis of the main body portion, having a larger first diameter at the outboard face of the main body portion and a smaller second diameter further inboard the main body portion, the main body portion further including an inboard section having a bore aligned generally coaxially with the outboard section frustro-conical bore, communicating with the inboard face of the main body portion and extending through the main body portion to the second diameter of the inboard section frustro-conical bore, said inboard section bore having a first diameter portion at its inboard end and a threaded smaller second diameter portion at its outboard end, said main body portion further including a threaded radial aperture in the inboard section communicating with the threaded second diameter of the inboard section bore;

a collapsible collet having a generally smooth wall bore along its longitudinal axis with a diameter slightly larger than the external diameter of the tool shank, said collet having a frustro-conical exterior surface adapted to be wedged into the frustro-conical bore in the main body portion outboard section and a plurality of axial slots allowing said collet to deform to a reduced diameter to thereby grasp the tool shank;

a collar having an axially oriented bore adapted to receive the tool therethrough, said collar also having internal threads to threadingly mate with the external threads at the outboard end of the main body portion outboard section, whereby rotation of said collar with respect to the main body portion will wedge the collet into the main body portion frustro-conical bore and thus deform the collet and reduce its diameter to thereby grasp the tool;

a cutter adjustment device having an externally threaded inboard section for mating engagement with the threaded second diameter portion of the main body portion inboard section bore and an outboard section having external threads for mating engagement with the threaded internal bore at the inboard face of the tool and a greater axial length than the threaded internal bore of the tool, whereby the cutter adjustment device effectively determines the axial position of the tool with respect to the tool holder; and a set screw having external threads for mating engagement with the threaded radial aperture in the main body portion inboard section whereby the radially inward face of said set screw contacts the outboard section at the cutter adjustment device to effectively lock the cutter adjustment device from axial movement with respect to the main body portion and thereby maintain the axial position of the tool against machining forces.

* * * * *